US005298183A

United States Patent [19]

Connor et al.

[11] Patent Number: 5,298,183

[45] Date of Patent: Mar. 29, 1994

[54] SOAP POWDER COMPOSITIONS

[75] Inventors: Jeffrey H. Connor, Wirral; Robert Donaldson, Birkenhead; Andrew T. Hight, Wirral; Gordon G. McLeod, Chester; Donald Peter, Wirral, all of England; Peter J. Russell, Yokohama, Japan

[73] Assignee: Lever Brothers Company, Division of Conopco, Inc., New York, N.Y.

[21] Appl. No.: 711,481

[22] Filed: Jun. 6, 1991

[30] Foreign Application Priority Data

Jun. 6, 1990 [GB] United Kingdom ................. 9012613

[51] Int. Cl.$^5$ ........................ B29C 67/24; C11D 17/00

[52] U.S. Cl. .................................... 252/121; 252/108; 252/134; 252/174.25; 264/117; 264/118; 264/140

[58] Field of Search ........... 252/108, 121, 134, 174.25, 252/551; 264/117, 118, 140

[56] References Cited

U.S. PATENT DOCUMENTS 5,133,924 7/1992 Appel et al. ........................ 264/117

FOREIGN PATENT DOCUMENTS

| | | |
|---|---|---|
| 0117568 | 9/1984 | European Pat. Off. . |
| 219314A | 4/1987 | European Pat. Off. . |
| 220024 | 4/1987 | European Pat. Off. . |
| 339996 | 11/1989 | European Pat. Off. . |
| 0339996 | 11/1989 | European Pat. Off. . |
| 340013A | 11/1989 | European Pat. Off. . |
| 342917 | 11/1989 | European Pat. Off. . |
| 0351937 | 1/1990 | European Pat. Off. . |
| 367339 | 5/1990 | European Pat. Off. . |
| 384070 | 8/1990 | European Pat. Off. . |
| 390251 | 10/1990 | European Pat. Off. . |
| 352135 | 11/1990 | European Pat. Off. . |
| 420317 | 4/1991 | European Pat. Off. . |
| 0425277 | 5/1991 | European Pat. Off. . |
| 62-086099A | 4/1987 | Japan . |
| 62-240397 | 11/1987 | Japan . |
| 62-273300 | 12/1987 | Japan . |
| 0114200 | 2/1990 | Japan . |
| 1429143 | 3/1976 | United Kingdom . |
| 1473201 | 5/1977 | United Kingdom . |
| 2034741 | 6/1980 | United Kingdom . |
| 2034741B | 6/1980 | United Kingdom . |

OTHER PUBLICATIONS

British Patent Office Search Report.

Bailey's Industrial Oil and Fat Products, vol. 1, 4th Ed. John Wiley & Sons, New York, 1979.

EP Search Report 91 30 5004.

*Primary Examiner*—Wayne Langel

*Attorney, Agent, or Firm*—James J. Farrell

[57] ABSTRACT

A soap powder having a bulk density of at least 600 g/liter contains 35–80 wt % of organic detergent-active material, of which 70–100 wt % is fatty acid soap of low (≦20° C.) Krafft temperature, and 20–65 wt % of inorganic and/or builder salts, and may be prepared by granulation and densification in a high-speed mixer/-granulator. The high bulk density soap powder shows improved powder properties and better wetting and dispersion behavior in the wash than corresponding undensified powder.

16 Claims, No Drawings

SOAP POWDER COMPOSITIONS

TECHNICAL FIELD

The present invention relates to soap-based detergent powders for washing fabrics.

BACKGROUND AND PRIOR ART

Fabric washing powders containing major quantities of soap are favoured by some consumers because of good detergency, and the tendency to leave clothes feeling softer than those washed with powders based on synthetic detergent-active compounds. Soap also has environmental advantages in that it is fully biodegradable, and is a natural material derived from renewable raw materials.

There is, however, a technical problem with soap in that it is not easy to obtain satisfactory dissolution, particularly at the low temperatures favoured in today's low-energy washing machines. There are two aspects of this problem: first, poor wetting characteristics can lead to clotting or gel formation; and secondly, even when wetting characteristics are satisfactory, there remains the problem of the inherent poor solubility of soap, particularly at low temperatures.

GB 2 034 741B (Unilever) discloses a soap powder composition of improved inherent solubility. The soap powder comprises, in addition to builder salts and other conventional ingredients, from 15 to 60 wt % of a defined soap blend having a low Krafft temperature (below 25° C.), derived from a $C_{12}$–$C_{22}$ fatty acid mixture comprising (i) from 5 to 60 wt % of one of more saturated or unsaturated fatty acids having 14 or fewer carbon atoms, (ii) from 5 to 32 wt % of one or more saturated fatty acids having more than 14 carbon atoms, (iii) from 35 to 90 wt % of one mor more unsaturated fatty acids having 14 or more carbon atoms.

This soap blend has been found to give good detergency with improved inherent solubility compared with standard coconut/tallow blends. However, the wetting characteristics of powders containing this blend have not proved ideal, the formation of clots being especially noticeable when the powders are used in a top-loading washing machine at a low wash temperature.

EP 340 013A (Unilever) discloses detergent powders based on synthetic detergent-active compounds (notably alkylbenzene sulphonate) and zeolite, granulated and densified to bulk densities above 650 g/liter in a high-speed mixer/granulator having both a stirring action and a cutting action, for example, the Fukae FS series mixer/granulator.

It has surprisingly been found that such granulation and densification of soap powder based on low-Krafft-temperature soap blends gives substantially improved wetting and dispersion characteristics without loss of other desirable properties, as well as substantially better powder properties (bulk density, flow, compressibility).

JP 62 086 099A (Nippon Oils & Fats) discloses a process for the manufacture of a composite soap powder (the term used in Japan for powders containing both soap and synthetic detergent-active materials, when the soap amounts to less than 70 wt % of the total detergent-active material). In the process, fatty acid soap (in the form of chips), synthetic detergent-active agent and inorganic and/or organic builders are disintegrated and mixed in a lateral-type mixer/granulator (a cylindrical housing containing two types of stirrers), to give a high-bulk-density product consisting of spherical granules even though the content of non-soap detergent is high. The product typically contains 40–55 wt % soap, 5–20 wt % nonionic surfactant (7–15 wt % exemplified) and 25–50 wt % builder. The choice of soap is apparently not critical; sodium beef tallow soap, potassium beef tallow soap and a mixed soap (coconut/soybean/beef tallow 4:1:15) are exemplified; and there is no disclosure of low-Krafft-temperature soap.

DEFINITION OF THE INVENTION

The present invention accordingly provides a soap powder having a bulk density of at least 600 g/liter, preferably at least 650 g/liter, and comprising:

(a) from 35 to 80 wt % of organic detergent-active material consisting of (a1) a fatty acid soap (70 to 100 wt %) having a Krafft temperature (as hereinafter defined) ≦20° C., (a2) optionally a non-soap detergent-active compound (0 to 30 wt %);

(b) from 20 to 65 wt % of inorganic salts and/or builder salts;

(c) optionally other detergent ingredients to 100 wt %.

The invention also provides a process for the preparation of a soap powder, which includes the step of treating a particulate starting material comprising (a) from 35 to 80 wt % of organic detergent-active material consisting essentially of (a1) a fatty acid soap (70 to 100 wt %) having a Krafft temperature (as hereinafter defined) $<$20° C., (a2) optionally a non-soap detergent-active compound (0 to 30 wt %), (b) from 20 to 65 wt % of inorganic salts and/or builder salts;

(c) optionally other detergent ingredients to 100 wt %, in a high-speed mixer/granulator having both a stirring action and a cutting action, whereby granulation and densification to a bulk density of at least 600 g/liter, preferably to at least 650 g/liter, are effected.

DETAILED DESCRIPTION OF THE INVENTION

The soap powder of the invention contains two essential ingredients: a detergent-active component (a) based on fatty acid soap, and a builder/salts component (b).

The Detergent-active Component (a)

The detergent-active component (a) constitutes from 35 to 80 wt % of the soap powder of the invention, preferably from 40 to 60 wt %.

At least 70 wt % of the detergent-active component (a) is constituted by fatty acid soap. The soap is of a type that has improved solubility at low wash temperatures, as characterised by a Krafft temperature not higher than 20° C., preferably not higher than 10° C., and desirably not higher than 8° C.

The solubility of a pure soap in water is determined by its Krafft temperature, which is the temperature above which the soap becomes readily soluble in water by the formation of micelles: see Lloyd I Osipow in "Surface Chemistry, Theory and Industrial Application", published by Reinhold & Co, New York, 1952.

However, the detergent formulator is normally dealing not with pure soaps but with natural products which are mixtures of salts of fatty acids of different chain length and unsaturation, and with blends of those.

We have therefore adopted here the following useful practical definition of Krafft temperature applicable to soap blends as well as to pure soaps: the phase transition temperature from crystalline to liquid of 20 wt % soap in water. This can be measured easily and quickly by the standard technique of differential thermal analysis (DTA).

Using this definition and method of measurement, the Krafft temperatures of the three soaps specifically disclosed in JP 62 086 099A (Nippon Oils & Fats) are as follows:

| | |
|---|---|
| sodium beef tallow | 46° C. |
| potassium beef tallow | 24° C. ± 3° C.* |
| coconut/soybean/beef tallow 4:1:15 | 39° C. |

*estimated from available data on pure Na and K soaps and on Na beef tallow soap.

The fatty acid soap used in the soap powder of the present invention may have any suitable cation, for example, sodium, potassium, ammonium, substituted ammonium (for example, monoethanolamine, triethanolamine), or any combination of these. As evidenced above by the figures for beef tallow soaps, potassium soaps tend to have lower Krafft temperatures than the corresponding sodium soaps; and so do the ammonium and amine soaps. However, all the non-sodium soaps are more expensive to produce than sodium salts; and may also give processing problems because of greater softness.

According to one especially preferred embodiment of the invention, the low Krafft temperature is achieved by the use of a blend of soaps of fatty acids having a specially selected combination of chain lengths and unsaturation. This enables sodium soaps, which are cheaper and of proven processability, to be used rather than soaps of alternative cations; and the good low-temperature solubility is not obtained at the expense of detergency.

Thus, in accordance with the aforementioned GB 2 034 741B (Unilever), the fatty acid soap (a1) in the soap powder of the invention is desirably a mixture of water-soluble salts of $C_{12}$–$C_{22}$ fatty acids comprising:

(i) from 5 to 60 wt % of one of more saturated or unsaturated fatty acids having 14 or fewer carbon atoms, (ii) from 5 to 32 wt % of one or more saturated fatty acids having more than 14 carbon atoms, (iii) from 35 to 90 wt % of one or more unsaturated fatty acids having 14 or more carbon atoms.

Especially preferred combinations are disclosed in GB 2 034 741B, the disclosure of which is hereby incorporated by reference.

Soaps within this definition cannot be obtained using only the classic soap-making materials coconut oil, palm kernel oil and tallow. Coconut oil and palm kernel oil are rich in the Group (i) fatty acids and tallow class fats are rich in the saturated and unsaturated fatty acids of Groups (ii) and (iii). Groundnut oil is a preferred natural source to enhance Group (iii) fatty acid content since this is high in oleic acid content and relatively low in linoleic and linolenic acids. Other oils relatively rich in Group (iii) acids include soybean oil, sunflower oil, rapeseed oil and cottonseed oil, but since those are all prone to oxidation due to a high linoleic/linolenic content, they are less preferred, and are best used in combination with a suitable antioxidant, for example ethylenediaminetetraacetic acid and/or ethane-1-hydroxy-1,1-diphosphonic acid.

Besides the naturally occurring oils, certain commercially available technical grade fatty acids also provide soaps suitable for use in the powders of the present invention.

Preferred soaps for use in the present invention may be obtained by combining sodium coconut soap with sodium oleate. One especially preferred mix comprises 50 wt % of each and contains 37 wt % Group (i) soap, 13 wt % Group (ii) soap and 50 wt % Group (iii) soap; its Krafft temperature is about 5° C.

The detergency of the fatty acid soap (a1) may if desired be boosted by the additional presence of non-soap (synthetic) detergent-active material (a2), provided that at least 70 wt % of the total detergent-active material is constituted by soap. Non-soap detergent active material (a2) is suitably present in an amount of from 10 to 30 wt %, more preferably from 20 to 28 wt %, based on the total detergent-active material (a).

Non-soap detergents are of course extremely well-known in the art. Anionic non-soap detergent-active materials are especially preferred because they enhance foaming as well as detergency. Suitable anionic surfactants include alkylbenzene sulphonates, alkane sulphonates, olefin sulphonates, primary and secondary alcohol sulphates, alkyl ether sulphates, dialkyl sulphosuccinates and fatty acid ester sulphonates.

Especially preferred for use in the soap powders of the present invention are alkyl ether sulphates.

Nonionic surfactants may also be used, but give very low-foaming compositions and are not preferred for compositions intended for use in top-loading washing machines. Suitable nonionic surfactants include the primary and secondary alcohol ethoxylates, especially the aliphatic $C_{12}$–$C_{15}$ primary and secondary alcohols ethoxylated with an average of 3–20 moles of ethylene oxide per mole of alcohol; alkylphenol ethoxylates; and alkylpolyglycosides. These lists are not intended to be exhaustive and for further examples the reader is referred to the standard literature, for example "Surface-Active Agents and Detergents", Volumes I and II, by Schwartz, Perry and Berch.

The Inorganic Salts and Builder Salts (b)

The compositions of the invention also contain inorganic salts which may have a detergency building function, and/or organic builder salts. Owing to the self-building nature of soaps the level of builder required is not as high as in a wholly non-soap detergent composition. Inorganic and/or builder salts are present in an amount of from 20 to 65 wt %.

One inorganic salt that is advantageously present is sodium carbonate. This enhances detergency by increasing alkalinity, as well as contributing to detergency building. Sodium carbonate is suitably used in an amount of from 5 to 30 wt %, preferably from 15 to 25 wt %.

Another preferred ingredient is sodium silicate, suitably in an amount of from 2 to 15 wt %. This also provides alkalinity, and protection against the corrosion of metal parts in washing machines.

Neutral salts such as sodium sulphate may also be present in order to increase ionic strength.

Inorganic builders that may be present include crystalline or amorphous alkali metal aluminosilicates, for example, zeolites A and X, and the novel zeolite—maximum aluminium zeolite P—described and claimed in EP 384 070A (Unilever).

Organic builder salts that may be present include polycarboxylate polymers such as polyacrylates, acrylic/maleic copolymers, and acrylic phosphinates; monomeric polycarboxylates such as citrates, gluconates, oxydisuccinates, glycerol mono-, di- and trisuccinates, carboxymethyloxysuccinates, carboxymethyloxymalonates, dipicolinates, hydroxyethyliminodiacetates; alkyl- and alkenylmalonates and succinates, and sulphonated fatty acid salts.

The compositions of the invention preferably do not contain more than 5 wt % of inorganic phosphate builders, and are desirably substantially free of phosphate builders.

Other Detergent Ingredients (c)

The soap powder compositions of the invention may if desired or appropriate contain other functional ingredients, for example, bleach ingredients, fluorescers, enzymes, hydrotropes such as sodium toluene sulphonate or sodium xylene sulphonate, and perfumes.

High Bulk Density

It is an essential feature of the soap powders of the invention that the bulk density is at least 600 g/liter. Bulk densities of 650 g/liter and above are especially desirable.

High-bulk-density compositions in accordance with the invention may be prepared by a variety of processes, batch or continuous, some involving post-tower densification of a spray-dried powder, and others involving wholly non-tower processing.

Preferred processes involve subjecting a particulate starting material to a granulation and densification treatment, preferably in a high-speed mixer/granulator. The starting material may be, in effect, a soap powder of conventional bulk density, already prepared by spray-drying or by a non-tower process such as dry mixing or granulation; alternatively, the high-speed mixer/granulator may be used to produce compositions of the invention directly from raw materials. Of course there are also possibilities between these extremes, in which the high-speed mixer granulator is fed with a preprepared base powder plus other ingredients, or with a mixture of two or more different preprepared base powders.

An especially preferred process in accordance with the invention comprises granulation and densification, in a high-speed mixer/granulator, of a starting material consisting at least partially, preferably predominantly or wholly, of spray-dried powder. It has been found that the densified product has better powder properties than the lower-bulk-density starting powder, and disperses better in the washing machine.

The granulation and densification may be carried out in a high-speed mixer/granulator having both a stirring action and a cutting action, as described and claimed in EP 340 013A (Unilever). Preferably the stirrer and the cutter may be operated independently of one another, and at separately variable speeds. Such a mixer is capable of combining a high energy stirring input with a cutting action, but can also be used to provide other, gentler stirring regimes with or without the cutter in operation. It is thus a highly versatile and flexible piece of apparatus.

A preferred type of batch high-speed mixer/granulator is bowl-shaped and preferably has a substantially vertical stirrer axis. Especially preferred are mixers of the Fukae (Trade Mark) FS-G series manufactured by Fukae Powtech Kogyo Co., Japan; this apparatus is essentially in the form of a bowl-shaped vessel accessible via a top port, provided near its base with a stirrer having a substantially vertical axis, and a cutter positioned on a side wall. The stirrer and cutter may be operated independently of one another, and at separately variable speeds.

Other similar batch mixers found to be suitable for use in the process of the invention are the Diosna (Trade Mark) V series ex Dierks & Söhne, Germany; and the Pharma Matrix (Trade Mark) ex T K Fielder Ltd., England. Other similar mixers believed to be suitable for use in the process of the invention include the Fuji (Trade Mark) VG-C series ex Fuji Sangyo Co., Japan; and the Roto (Trade Mark) ex Zanchetta & Co srl, Italy.

Another batch mixer found to be suitable for use in the process of the invention is the Lödige (Trade Mark) FM series batch mixer ex Morton Machine Co. Ltd., Scotland. This differs from the mixers mentioned above in that its stirrer has a horizontal axis.

Preferred process conditions and other details are described at length in the aforementioned EP 340 013A (Unilever), which is hereby incorporated by reference.

It may be desirable, and for some compositions even essential, for granulation/densification to be carried out in the presence of a finely divided particulate flow aid. The flow aid suitably has an average particle size within the range of from 0.1 to 20 μm, preferably from 1 to 10 μm.

A preferred material is finely divided amorphous sodium aluminosilicate, for example, Alusil (Trade Mark) ex Crosfield Chemicals Ltd, Warrington, Cheshire, England. Alusil is suitably used in amounts of from 1 to 7 wt %, preferably from 1.5 to 5 wt %.

It may also be beneficial to admix (further) flow aid after granulation is complete, as described and claimed in EP 339 996A (Unilever). Again, Alusil is a preferred material, and is suitably used in amounts of from 0.2 to 5 wt %, preferably from 0.5 to 3 wt %.

As indicated previously, the Fukae and similar mixers require batch operation. Alternatively, continuous processes may be employed, for example, using a continuous high-speed mixer/granulator such as the Lödige (Trade Mark) Recycler, optionally followed by a moderate-speed continuous mixer/granulator such as the Lödige Ploughshare. As with the Fukae mixer, this apparatus can be used for both post-tower and non-tower processes, including in-situ preparation from raw materials. Suitable processes are disclosed in EP 367 339A, EP 390 251A and EP 420 317A (Unilever), and in our copending European Patent Application No. 91 200 740.8.

The granulate obtained from the mixer/granulator may be used as a complete detergent composition in its own right. Alternatively, it may be admixed with other components or mixtures prepared separately, and may form a major or minor part of a final product.

Particle Size Distribution

It has been found that particularly good dispersability and powder properties are obtained if the level of fine particles (particles <180 μm) is not too high, preferably not exceeding 20 wt %, more preferably not exceeding 15 wt % and most preferably not exceeding 10 wt %. Advantageously, fine particles may removed from the densified product by sieving, and it is then possible to achieve levels of 1 wt % or less.

EXAMPLES

The following Examples illustrate the invention. Parts and percentages are by weight unless otherwise stated.

EXAMPLE 1

A soap base powder was prepared to the following composition by spray-drying an aqueous slurry:

| | parts |
|---|---|
| Sodium soap (see below) | 39 |
| Alkyl ether sulphate ($C_{12}$-$C_{15}$, 3EO) | 14 |
| Sodium carbonate | 20 |
| Sodium alkaline silicate | 10 |
| Sodium sulphate | 5 |
| Sodium toluene sulphonate | 2 |
| Minor ingredients (fluorescer, EDTA, sodium carboxymethylcellulose) | 1.6 |
| Moisture | 8.0 |
| | 99.60 |

The soap was a 50:50 (by weight) mixture of sodium coconut soap and sodium oleate. It contained 37 wt % of Group (i) soap, 13 wt % of Group (ii) soap and 50 wt % of Group (iii) soap. Its Krafft temperature was 5° C.

A batch of this base powder was densified in the Fukae FS-100 high speed mixer/granulator as follows. 39 kg of the base powder and 1.0 kg of Alusil flow aid were charged into the mixer and granulated for 12 minutes at a stirrer speed of 130 rpm and a cutter speed of 1676 rpm. A further 500 g of Alusil were added and granulation continued for a further 5 minutes. The total amount of Alusil present during granulation was thus 3.7 wt %. A further 700 g of Alusil (ie 1.7 wt %) were then mixed in while the mixer was operated at a stirrer speed of 80 rpm and a cutter speed of 300 rpm. The product was then discharged.

The powder properties of the base powder before and after densification were as follows:

| | Before | After |
|---|---|---|
| Bulk density (g/l) | 256 | 676 |
| Dynamic flow rate (ml/s) | 83 | 120 |
| Compressibility (% v/v) | 39 | 9 |

The densified powder contained <7 wt % of particles >2000 μm. The content of fines (particles <180 μm) was rather high (37 wt %), so these were removed by sieving, to give a fines content of about 0.6 wt %.

Dispersion of the densified powder in water in a Japanese top-loading washing machine (National (Trade Mark) Electronic W100) at 8° C. was complete within 50 seconds, whereas the corresponding time for the undensified base powder was 140 seconds. Conductivity measurements showed that complete dissolution of the densified powder occurred within 2-3 minutes.

Washing Machine Evaluation

Complete products were made up from the undensified base powder (Comparative Example A) and the densified base powder (Example 1) by postdosing the following ingredients:

| | parts |
|---|---|
| Enzyme (Savinase 6.0 CM) | 0.7 |
| Perfume | 0.1-0.2 |

Detergency was assessed using three differently soiled test cloths:

| | |
|---|---|
| Test Cloth 1 | Oily/particulate |
| Test Cloth 2 | Proteinaceous |
| Test Cloth 3 | Oily/particulate/proteinaceous |

The two products were each used to wash a 1.5 kg soiled cotton load, in the presence of the test cloth monitors, in a National Electronic W100 top-loading washing machine; product dosage was 1.17 g/liter into 30 liters of water (6° French hard in $Ca^{2+}$). The wash temperature was 8° C., the wash time 10 minutes with an 10-minute running rinse. Reflectance data at 460 nm of the washed cloths were measured using a Micromatch (Trade Mark) reflectometer.

For comparison, a wholly non-soap detergent powder commercially available in Japan (Comparative Example B) and a liquid soap product commercially available in Germany (Comparative Example C) were also included in the test.

The powder of Example 1 dispersed in the machine in <1 minute, whereas the powder of Comparative Example A formed clumps on the surface which took >2 minutes to disperse. Neither powder left residues on the washload at the end of the wash.

Detergency results (reflectance $\delta R_{460}$) were as tabulated below.

| Test cloth | 1 | A | B | C |
|---|---|---|---|---|
| 1 | 15.5 | 16.1 | 14.4 | 13.3 |
| 2 | 6.9 | 8.0 | 6.7 | 6.0 |
| 3 | 14.6 | 16.8 | 14.0 | 11.8 |

Although the detergency of the densified product was slightly poorer than that of the undensified product, it was nevertheless better than that of the wholly non-soap commercial product, and substantially better than that of the soap liquid.

We claim:

1. A soap powder having a bulk density of at least 600 g/liter and comprising:

(a) from 35 to 80 wt % of organic detergent-active material consisting essentially of:

(a1) a fatty acid soap, in an amount of from 70 to 100 wt % of said organic detergent-active material, said fatty acid soap having a Krafft temperature, not greater than 20° C., and said fatty acid soap being a mixture of water-soluble salts of $C_{12}$-$C_{22}$ fatty acids comprising:

(1) from 5 to 60 wt % of one or more saturated or unsaturated fatty acids having 14 or fewer carbon atoms, (ii) from 5 to 32 wt % of one or more saturated fatty acids having more than 14 carbon atoms, and (iii) from 35 to 90 wt % of one or more unsaturated fatty acids having 14 or more carbon atoms;

(a2) a non-soap detergent-active compound in an amount of from 0 to 30 wt % of said organic detergent-active material;

(b) from 20 to 65 wt % of inorganic salts and/or builder salts;

(c) optionally other detergent ingredients to 100 wt %.

2. A soap powder as claimed in claim 1, having a bulk density of at least 650 g/liter.

3. A soap powder as claimed in claim 1, wherein the fatty acid soap (a1) has a Krafft temperature not greater than 10° C.

4. A soap powder as claimed in claim 3, wherein the fatty acid soap (a1) has a Krafft temperature not greater than 8° C.

5. A soap powder as claimed in claim 1, wherein the fatty acid soap (a1) is a sodium soap.

6. A soap powder as claimed in claim 1, wherein the fatty acid soap (a1) is a mixture of coconut soap and oleic soap.

7. A soap powder as claimed in claim 1, which contains from 10 to 30 wt %, based on the total detergent-active material (a), of a synthetic detergent-active compound (a2).

8. A soap powder as claimed in claim 7, which contains from 20 to 28 wt %, based on the total detergent-active material (a), of a synthetic detergent-active compound (a2).

9. A soap powder as claimed in claim 7, wherein the synthetic detergent-active compound (a2) comprises an alkyl ether sulphate.

10. A soap powder as claimed in claim 1, which contains ≦20 wt % of particles smaller than 180 μm.

11. A process for the preparation of a soap powder, which includes the step of treating a particulate starting material comprising:

(a) from 35 to 80 wt % of organic detergent-active material consisting essentially of:

(a1) a fatty acid soap, in an amount of from 70 to 100 wt % of said organic detergent-active material, said fatty acid soap having a Krafft temperature, not greater than 20 ° C., and said fatty acid soap being a mixture of water-soluble salts of $C_{12}$–$C_{22}$ fatty acids comprising:

(i) from 5 to 60 wt % of one or more saturated or unsaturated fatty acids having 14 or fewer carbon atoms, (ii) from 5 to 32 wt % of one or more saturated fatty acids having more than 14 carbon atoms, and (iii) from 35 to 90 wt % of one or more unsaturated fatty acids having 14 or more carbon atoms;

(b) from 20 to 65 wt % of inorganic salts and/or builder salts, (c) optionally other detergent ingredients to 100 wt %, in a high-speed mixer/granulator having both a stirring action and a cutting action, and granulating and densifying the material to a bulk density of at least 600 g/liter.

12. A process as claimed in claim 11, wherein the soap powder is granulated and densified to a bulk density of at least 650 g/liter.

13. A process as claimed in claim 11, wherein the granulation and densification are carried out in a bowl-type mixer/granulator having a substantially vertical stirring axis.

14. A process as claimed in claim 11, wherein the particulate starting material consists at least partially of a spray-dried powder.

15. A process as claimed in claim 11, wherein granulation and densification are carried out in the presence of a finely divided particulate flow aid.

16. A process as claimed in claim 14, wherein the finely divided particulate flow aid is amorphous sodium aluminosilicate and is present in an amount of from 1 to 7 wt %.

* * * * *